United States Patent [19]

Abe et al.

[11] Patent Number: 4,920,170

[45] Date of Patent: Apr. 24, 1990

[54] PROCESS FOR PRODUCING FLUORINE-CONTAINING ELASTIC COPOLYMER

[75] Inventors: Masatoshi Abe; Shin Okamoto; Akihiro Naraki, all of Kitaibaraki, Japan

[73] Assignee: Nippon Mektron Limited, Tokyo, Japan

[21] Appl. No.: 212,587

[22] Filed: Jun. 28, 1988

[30] Foreign Application Priority Data

Jul. 17, 1987 [JP] Japan .................. 62-177089

[51] Int. Cl.$^5$ .................................. C08F 16/24
[52] U.S. Cl. .................................... 526/247
[58] Field of Search ........................ 526/247

[56] References Cited

U.S. PATENT DOCUMENTS

| | | |
|---|---|---|
| 4,281,092 | 7/1981 | Breazeale . |
| 4,564,662 | 1/1986 | Albin .................. 526/247 |
| 4,619,983 | 10/1986 | Yamake et al. ............ 526/247 |
| 4,748,223 | 5/1988 | Haruyoshi et al. ......... 526/206 |
| 4,766,190 | 8/1988 | Morita et al. ............ 526/247 |

FOREIGN PATENT DOCUMENTS

| | | | |
|---|---|---|---|
| 0075312 | 3/1983 | European Pat. Off. ........... 526/247 |
| 0131308 | 1/1985 | European Pat. Off. ........... 526/247 |
| 0153848 | 9/1985 | European Pat. Off. ........... 526/247 |
| 0193963 | 9/1986 | European Pat. Off. ........... 526/247 |
| 41942 | 2/1973 | Japan . |
| 20788 | 6/1973 | Japan . |
| 71906 | 4/1983 | Japan . |
| 61-223007 | 10/1986 | Japan ................... 526/247 |

*Primary Examiner*—Joseph L. Schofer
*Assistant Examiner*—N. Sarofim
*Attorney, Agent, or Firm*—Fred Philpitt

[57] ABSTRACT

A fluorine-containing elastic copolymer with distinguished low temperature characteristics, comprising (a) about 30 to about 80% by mole of tetrafluoroethylene, (b) about 5 to about 60% by mole of perfluoro(lower alkyl vinyl ether) and (c) a perfluoroether compound represented by following general formula:

$$CF_2=CFOCF_2CFXORf$$

wherein X: F or $-CF_3$ and Rf: $-C_nF_{2n+1}$, is obtained by copolymerizing the (a) component, the (b) component and the (c) component in the presence of a radical polymerization initiator.

9 Claims, No Drawings

PROCESS FOR PRODUCING FLUORINE-CONTAINING ELASTIC COPOLYMER

BACKGROUND OF THE INVENTION

1. Field of the Invention

This invention relates to a process for producing a fluorine-containing elastic copolymer, and more particularly to a process for producing a fluorine-containing elastic copolymer with distinguished low temperature characteristics.

2. Description of the Prior Art

Japanese Patent Application Kokai (Laid-open) No. 58-71906 discloses a process for producing a fluorine-containing elastic copolymer by copolymerizing fluorovinylether represented by the following general formula:

$$CF_2=CF(OCF_2CFX)_nORf$$

with tetrafluoroethylene, etc. The thus obtained fluorine-containing elastic copolymer has ethereal bonds in the main chain and its glass transition temperature is lowered with increasing content of the ethereal bonds (15–50% by mole in terms of fluorovinylether). However, when the copolymerization reaction is carried out by solution polymerization, i.e. the ordinary polymerization procedure, the solution viscosty increases with the progress of the copolymerization reaction, and stirring of the copolymerization system becomes hard to carry out. As a result, dispersion of the resulting copolymers becomes poorer, and it is difficult to conduct control of the heat of polymerization and uniform heating (see Japanese Patent Publication No. 48-41942). In case of emulsion polymerization, on the other hand, the copolymerization reaction must be carried out at a relatively high temperature, and the resulting copolymers often have unstable terminal groups, and separation of the emulsifying agent from the reaction mixture is very difficult to carry out (Japanese Patent Publication No. 48-20788). Thus, there are problems in the copolymerization and desired elastic copolymers are hard to obtain.

U.S. Pat. No. 4,281,092 discloses a process for producing a fluorine-containing elastic copolymer by copolymerizing tetrafluoroethylene with perfluoro(lower alkyl vinyl ether) in the presence of a curing site monomer represented by the following general formula:

$$CF_2=CF[OCF_2CF(CF_3)]_mO(CF_2)_nCN$$

However, the lowering of the glass transition temperature of the fluorine-containing elastic copolymer is not satisfactory, even if the copolymerization ratio of perfluoro(lower alkyl vinyl ether) is made as high as possible.

SUMMARY OF THE INVENTION

An object of the present invention is to provide a process for producing a fluorine-containing elastic copolymer with distinguished low temperature characteristics.

Another object of the present invention is to provide a process for producing a fluorine-containing elastic copolymer through smooth copolymerization reaction.

DETAILED DESCRIPTION OF THE INVENTION

These objects of the present invention can be attained by copolymerizing (a) tetrafluoroethylene, (b) perfluoro(lower alkyl vinyl ether) and (c) a perfluoroether compound represented by the following general formula:

$$C_2=CFOCF_2CFXORf$$

wherein X is a fluorine atom or a trifluoromethyl group and Rf is a perfluoroalkyl group, in the presence of a radical polymerization initiator, thereby producing a fluorine-containing elastic copolymer comprising about 30 to about 80% by mole of the (a) component, about 5 to about 60% by mole of the (b) component and about 3 to about 50% by mole of the (c) component, the sum total of the (a) component, the (b) component and the (c) component being 100% by mole.

A perfluoro(lower alkyl) group having 1 to 5 carbon atoms is used for the (b) component perfluoro(lower alkyl vinyl ether). A perfluoroalkyl group having 1 to 12 carbon atoms is usually used for the (c) component perfluoroether compound.

When an iodine and bromine-containing compound is added to the copolymerization reaction system, iodine and bromine can be combined with the molecules at the terminals of the resulting copolymers in a radically active state, and thus the resulting copolymers can be vulcanized with a peroxide as a radical source in the presence of a polyfunctional compound such as triallyl isocyanurate, triallyl cyanurate, etc.

The iodine and bromine-containing compound for this purpose includes, for example, such linear compounds as 1-bromo-2-iodoperfluoroethane, 1-bromo-3-iodoperfluoropropane, 1-bromo-4-iodoperfluorobutane, 1-bromo-2-iodo-1-chloroperfluoroethane, etc., and such aromatic compounds as o-, m- or p-iodobromobenzene, 3,5-dibromo-1-iodobezene, 3,5-diiodo-1-bromobenzene, etc. Other examples of the iodine and bromine-containing compounds are disclosed in U.S. patent application Ser. No. 025,191, now U.S. Pat. No. 4,748,223.

Copolymerization reaction between the monomer components can be carried out by bulk polymerization, suspension polymerization, solution polymerization, etc., preferably by emulsion polymerization. The polymerization initiator is preferably used as a redox system. For example, copolymerization reaction is carried out with an ammonium persulfate-sodium hydrogen sulfite redox system at a temperature of about 20° to about 80° C., preferably about 30° about 50° C., while protecting the terminals of the resulting copolymers. As a surfactant serving as an emulsifying agent, perfluoroalkyl carboxylates such as ammonium perfluorooctanoate, etc. can be used.

When a fluorinated alcohol soluble in water and both (b) and (c) components is added to the aqueous phase of the comonomer mixture during the copolymerizaton reaction, the fluorinated alcohol can increase the solubilities of both (b) and (c) components in the aqueous phase and contributes to transfer to the comonomers from the droplets suspended in the aqueous medium to the polymerization sites.

The fluorinated alcohol for this purpose includes, for example, trifluoroethanol, hexafluoroisopropanol, ω-hydro-2,2,3,3-tetrafluoropropanol, etc.

The emulsion stability in the copolymerization reaction depends upon relative amounts of the surfactant and the fluorinated alcohol, and generally will increase with increasing amounts of the surfactant and the fluorinated alcohol to be added to the aqueous phase. However, from the viewpoint of decreasing the amount of the surfactant remaining in the resulting fluorine-containing elastic copolymers and reducing the amount of relatively expensive fluorinated alcohol, about 0.2 to about 5% by weight, preferably about 0.3 to about 1% by weight of the surfactant and about 1 to about 5% by weight, preferably about 1.5 to about 3% by weight of the fluorinated alcohol are used on the basis of the aqueous phase.

The resulting fluorine-containing copolymer is adjusted to a composition of about 30 to about 80% by mole of the (a) component, about 5 to about 60% by mole of the (b) component and about 3 to about 50% by mole of the (c) component, the sum total of the (a) component, the (b) component and the (c) component being 100% by mole. If the composition is outside these ranges, the desired fluorine-containing elastic copolymer with distinguished low temperature characteristics cannot be obtained or no smooth copolymerization can be carried out any more.

When an observation is made with respect to, for example, the (c) component perfluoroether compound, a copolymer consisting of 45% by mole of the (a) component and 55% by mole of the (b) component has poor low temperature characteristics, and a copolymer consisting of 35% by mole of the (a) component, 10% by mole of the (b) component and 55% by mole of the (c) component cannot be obtained, even if tried, because it is hard to copolymerize the (c) component as the vinylether having a long side chain with the (a) component and polymerization of the (a) components themselves proceeds preferentially, even if the (c) component is charged in large excess over the (a) component.

As the (c) component, compound having a (OF$_2$OCFX)$_n$ group, i.e. $CF_2=CF(OCF_2CFX)_nORf$, have been used in the prior art as mentioned before, and it has been found that the copolymerizability of the (a) and (b) components is decreased with increasing number of n, the desired improvement of the low temperature characteristics of the copolymer is hard to attain and the proportion of unstable terminals is increased, resulting in an increase in the amount of volatile matters to be evolved during the vulcanization, causing foam formation in the vulcanized product. Thus, in the present invention, n is limited to 1.

Vulcanization of the thus obtained fluorine-containing elastic copolymer can be carried out according to an ordinary peroxide vulcanization procedure. Among various organic peroxides available for the vulcanization, di-tert-butylperoxyalkane is preferably used as an involatile vulcanizing agent having a heat stability which can satisfactorily withstand the high temperature at the vulcanization. At the vulcanization, a polyfunctional compound such as triallyl isocyanurate, etc. can be used as a co-vulcanizing agent. The vulcanization with these vulcanizing agent and the co-vulcanizing agent can be usually carried out by press vulcanization at about 150° to about 200° C. for about 5 to about 15 minutes and by oven vulcanization at about 150° to about 200° C. for about 3 to about 10 hours.

According to the present invention, a fluorine-containing elastic copolymer having distinguished elastic characteristics even at a low temperature and a high resistance to corrosive chemicals in a wide range of temperatures can be obtained. The present fluorine-containing elastic copolymer can be appropriately used in molding oil seals, packings, gaskets, etc. in the aerospace machinery, fuel tanks, petrochemical plants, etc.

PREFERRED EMBODIMENTS OF THE INVENTION

The present invention will be described in detail below, referring to Examples.

EXAMPLE 1

120 g of deaerated, demineralized water, 4.5 g ammonium perfluorooctanoate as a surfactant, 18 g of hexafluoroisopropyl alcohol as a dispersing agent and 1.9 g of 1-iodo-2-bromoperfluoroethane were charged into a 3 l autoclave with a stirrer, and the entire autoclave was cooled to −30° C. Then, the gas in the inside space of the autoclave was thoroughly replaced with pure nitrogen gas, and then discharged therefrom, and the following monomeres were charged therein under pressure in this order:

| | | |
|---|---|---|
| $CF_2=CFOCF_2CF(CF_3)OC_3F_7$ | [FPVPE] | 174 g |
| $CF_2=CFOCF_3$ | [FMVE] | 334 g |
| $CF_2=CF_2$ | [TFE] | 161 g |

Then, the temperature of the reaction system was elevated to 45° C., and a solution containing a redox polymerization initiator consisting of 4.8 g of ammonium persulfate and 0.3 g of sodium hydrogen sulfite in 20 g of water was charged therein and copolymerization reaction was initiated with stirring.

The pressure of 16 kg/cm$^2$ at the initiation of the copolymerization reaction was lowered to 10 kg/cm$^2$ at 18 hours thereafter, and upon confirmation of no more pressure decrease, the unreacted gas mixture was purged from the autoclave to discontinue the copolymerization reaction. An aqueous 5% sodium chloride solution was added to the resulting aqueous emulsion to coagulate the product. The product was washed with water and dried, whereby 328 g of rubbery copolymer was obtained.

It was found by $^{19}$F-NMR assay that the rubbery copolymer consisted of 6% by mole of FPVE, 39% by mole of FMVE and 55% by mole of TFE.

EXAMPLE 2

297 g of rubbery copolymer was obtained in the same manner as Example 1, except that the amount of FPVE to be used was changed to 300 g, that the FMVE to 230 g and that of TFE to 140 g and the copolymerization reaction time was also changed to 15 hours.

It was found that the thus obtained rubbery copolymer consisted of 14% by mole of FPVE, 35% by mole of FMVE and 51% by mole of TFE.

EXAMPLE 3

238 g of rubbery copolymer was obtained in the same manner as in Example 1, except that the amount of FPVE to be used was changed to 400 g, that of FMVE to 153 g and that of TFE to 123 g, and the copolymerization reaction time was also changed to 16 hours.

It was found that the thus obtained rubbery copolymer consisted of 19% by mole of FPVE, 26% by mole of FMVE and 55% by mole of TFE.

COMPARATIVE EXAMPLE 1

362 g of rubbery copolymer was obtained in the same manner as in Example 1 except that no FPVE was used and 480 g of FMVE and 192 g of TFE were used.

It was found that the thus obtained rubbery copolymer consisted of 55% by mole of FMVE and 45% by mole of TFE.

COMPARATIVE EXAMPLE 2

200 g of FPVE, 0.04 ml of a R-113 (trichlorofluoroethane) solution containing 1,3,5-trichloroperfluorohexanoyl peroxide at a concentration of 1 g/ml and 0.21 g of 1-iodo-2-bromoperfluoroethane were charged into a 500 ml autoclave with a stirrer and the gas in the inside space of the autoclave was rapidly replaced with TFE and the autoclave was pressurized to 5 kg/cm$^2$ with TFE. Copolymerization was initiated with stirring at 15° C.

15 hours after the initiation of copolymerization reaction, a pressure drop by 1.0 kg/cm$^2$ was observed, and thus 0.015 ml of the peroxide solution was additionally charged into the autoclave and the pressure was returned to 5 kg/cm$^2$ with TFE to continue the copolymerization reaction. 20 hours thereafter, a pressure drop by 1.2 kg/cm$^2$ was observed and the pressure was likewise returned to 5 kg/cm$^2$ to further continue the reaction for 28 hours, where a pressure drop was by 1.6 kg/cm$^2$.

At this point, solidification took place no stirring could be made any more. Thus, TFE was purged from the autoclave to discontinue the copolymerization reaction. When the autoclave was opened, the content had no substantial flowability and thus 200 ml of R-113 was added thereto to dissolve the solid content. The solution was taken out of the autoclave and treated with acetone to precipitate the product. Then, the product was dried under reduced pressure, whereby 128 g of rubbery copolymer was obtained.

It was found that the thus obtained copolymer consisted of 32% by mole of FPVE and 68% by mole of TFE.

EXAMPLE 4

292 g of rubbery copolymer was obtained in the same manner as in Example 1, except that 250 g of CF$_2$=CFOCF$_2$CF(CF$_3$)OCF$_3$ was used in place of FPVE, the amounts of FMVE and TFE to be used were changed to 250 g and 150 g, respectively, and the copolymerization reaction time was changed to 14 hours.

It was found that the thus obtained rubbery copolymer consisted 14% by mole of CF$_2$=CFOCF$_2$CF(CF$_3$)OCF$_3$, 32% by mole of FMVE and 54% by mole of TFE.

EXAMPLE 5

308 g of rubbery copolymer was obtained in the same manner as in Example 1, except that 210 g of CF$_2$=CFOCF$_2$CF$_2$OCF$_3$ was used in place of FPVE, the amounts of FMVE and TFE to be used were changed to 250 g and 150 g, respectively, and the copolymerization reaction time was changed to 17 hours.

It was found that the thus obtained rubbery copolymer consisted of 14% by mole of CF$_2$=CFOCF$_2$CF$_2$OCF$_3$, 35% by mole of FMVE and 51% by mole of TFE.

15 parts by weight of MT carbon black, 0.8 parts by weight of 2,5-dimethyl-2,5-di(tert-butylperoxy)hexane and 2 parts of triallyl isocyanurate were added to 100 parts by weight of the copolymer obtained in any one of the foregoing Examples and Comparative Examples, and the resulting mixture was roll kneaded to obtain a compound.

The compound was press vulcanized at 180° C. for 10 minutes and then oven vulcanized at 175° C. for 6 hours to obtain a vulcanized product in a sheet form. Physical properties of the thus vulcanized product were determined according to JIS K-6301 procedure and also the vulcanized product was subjected to low temperature test (TR test) as an evaluation of the cold resistance of the vulcanized product, where TR-10 value and TR-70 value were measured to obtain the crystallization tendency during the low temperature preservation. The results are shown in the following Table.

TABLE

| Items | Example No. 1 | 2 | 3 | Comp. Ex. No. 1 | 2 | Example No. 4 | 5 |
|---|---|---|---|---|---|---|---|
| [Normal state physical properties] | | | | | | | |
| Hardness (JIS A) | 81 | 79 | 77 | 80 | 87 | 77 | 78 |
| 100% modulus (kgf/cm$^2$) | 69 | 68 | 70 | 73 | 79 | 67 | 58 |
| Tensile Strength (kgf/cm$^2$) | 178 | 159 | 154 | 195 | 132 | 155 | 165 |
| Elongation (%) | 204 | 181 | 175 | 224 | 154 | 178 | 198 |
| [Low temperature test] | | | | | | | |
| TR-10 (°C.) | −8 | −11 | −13 | −3 | −15 | −12 | −13 |
| TR-70 (°C.) | +5 | +5 | +3 | +8 | +5 | +3 | +2 |

As is apparent from the foregoing results, the present fluorine-containing elastic copolymer has a considerably lowered TR-10 value as an evaluation of the low temperature resistance of vulcanized products obtained by peroxide vulcanization, as compared with the conventional fluorine-containing elastic copolymers.

What is claimed is:

1. A process for producing a fluorine-containing elastic copolymer comprising (a) 30 to 80% by mole of tetrafluoroethylene (b) 26 to 60% by mole of perfluoro (lower alkyl vinyl ether) and (c) 3 to 50% by mole of a perfluoroether compound represented by the following general formula:

$$CF_2=CFOCF_2CFXORf$$

wherein X is a fluorine atom or a trifluoromethyl group and Rf is a perfluoroalkyl group, which comprises copolymerizing the (a) component, the (b) component and the (c) component in the presence of a radical polymerization initiator.

2. A processor according to claim 1 wherein the (b) component has a perfluoro (lower alkyl) group having 1 to 5 carbon atoms.

3. A process according to claim 1 wherein the (c) component has a perfluoroalkyl group having 1 to 12 carbon atoms.

4. A process according to claim 1 wherein the copolymerization reaction is carried out in the presence of an iodine and bromine-containing compound.

5. A process according to claim 1 wherein the radical polymerization initiator is used in a redox system.

6. A process according to claim 1 wherein the copolymerization reaction is carried out by emulsion polymerization.

7. A fluorine-containing elastic copolymer comprising (a) 30 to 80% by mole of tetrafluoroethylene, (b) 16 to 60% by mole of perfluoro (lower alkyl vinyl ether) and (c) 3 to 50% by mole of a perfluoroether compound represented by the following general formula:

$$CF_2=CFOCF_2CFXORf$$

wherein X is a fluorine atom or a trifluoromethyl group and Rf is a perfluoroalkyl group.

8. A fluorine-containing elastic copolymer according to claim 7 wherein the (b) component has a perfluoro (lower alkyl) group having 1 to 5 carbon atoms.

9. A fluorine-containing elastic copolymer according to claim 7 wherein the (c) component has a perfluoroalkyl group having 1 to 12 carbon atoms.

* * * * *